Sept. 28, 1926.

E. VIANELLO 1,601,384

STEAM REGENERATING SYSTEM

Filed Dec. 30, 1921  8 Sheets-Sheet 1

Inventor
E. Vianello,
By Marks & Clark
Attys.

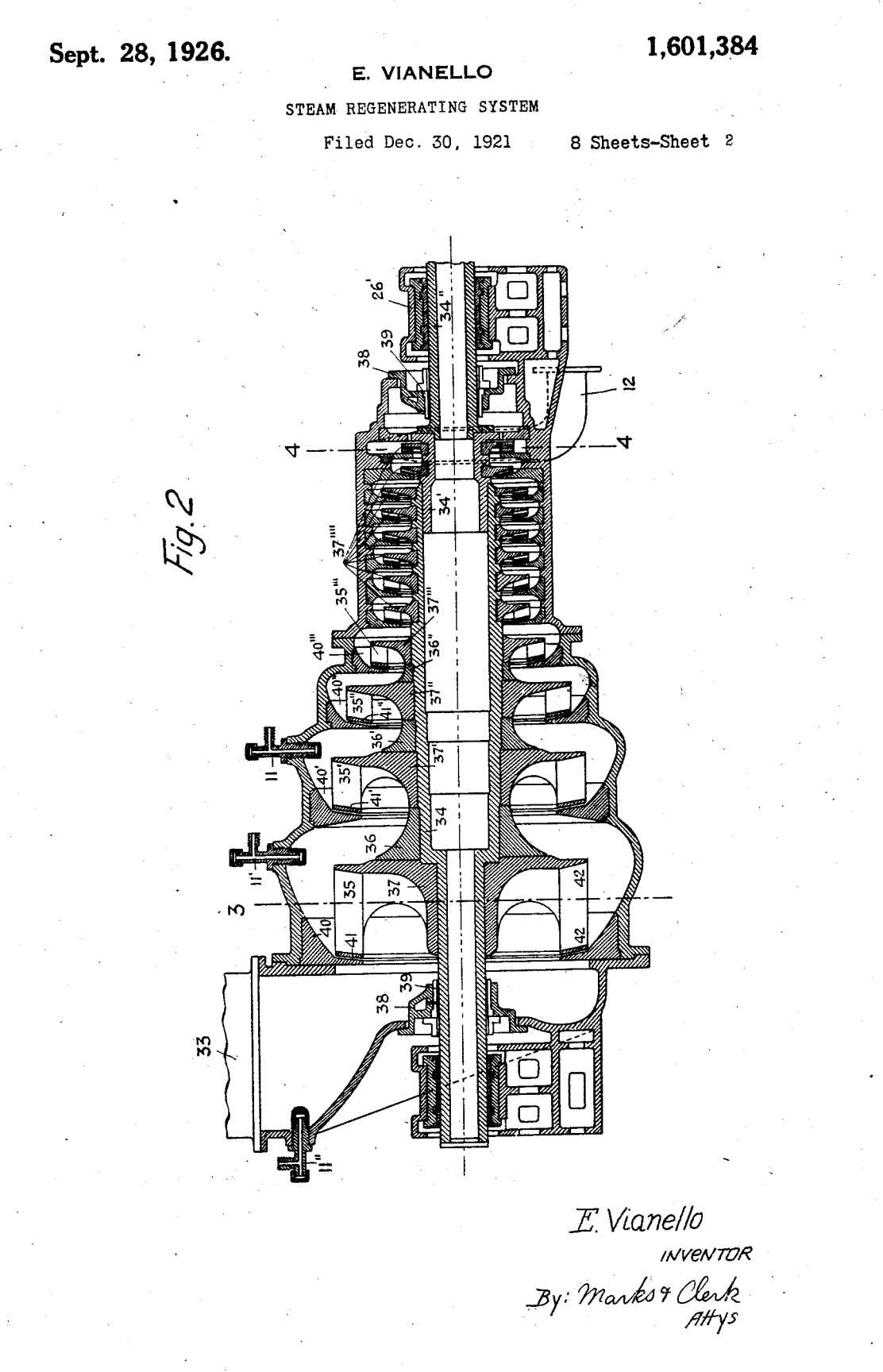

Sept. 28, 1926.
E. VIANELLO
1,601,384
STEAM REGENERATING SYSTEM
Filed Dec. 30, 1921    8 Sheets-Sheet 3
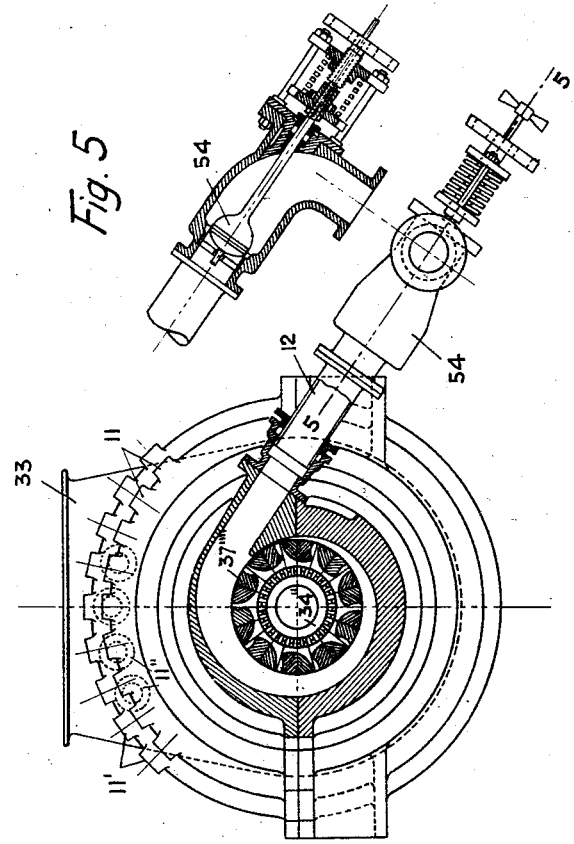
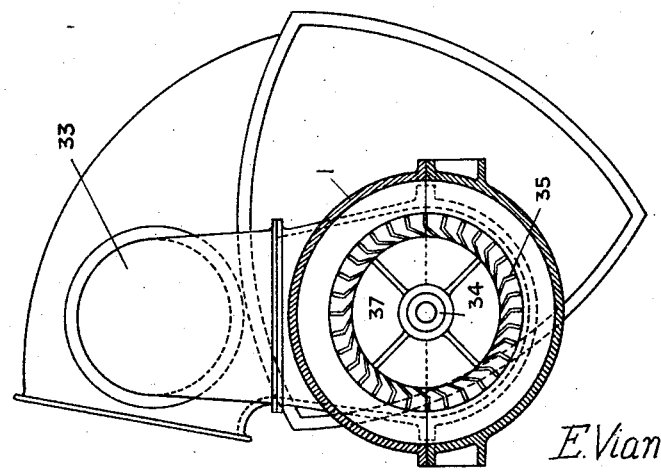
E. Vianello
INVENTOR
By: Marks & Clerk
Attys

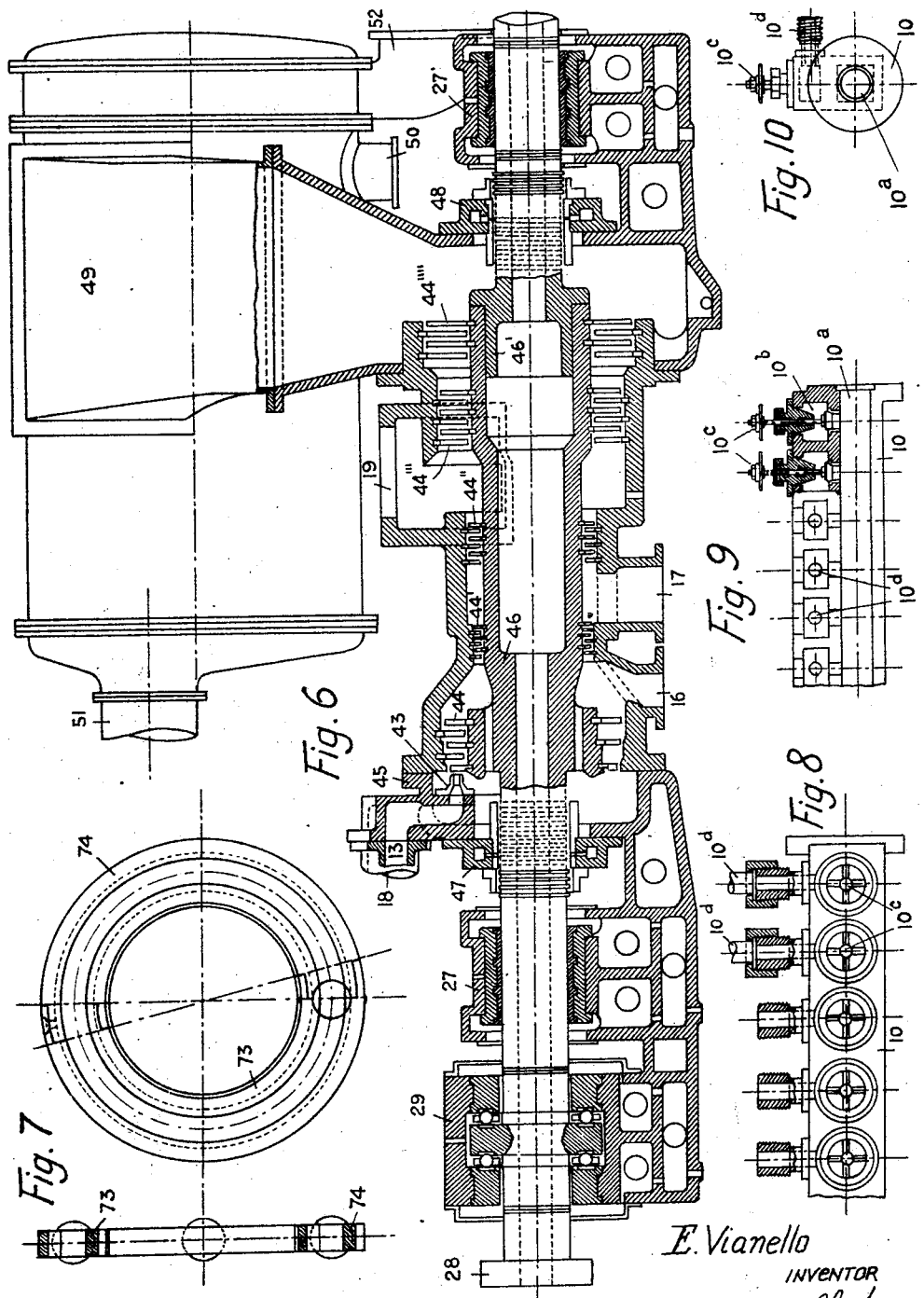

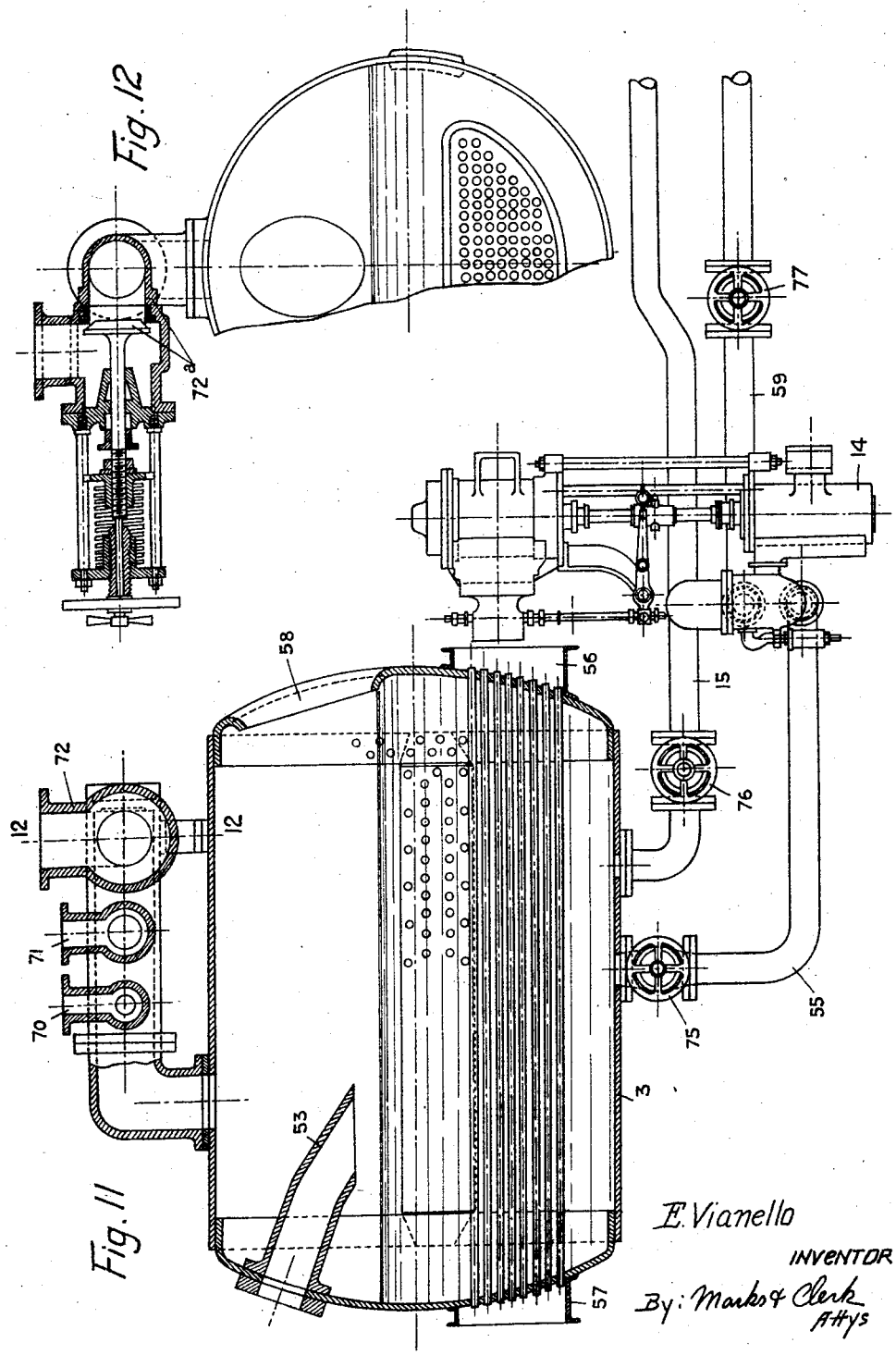

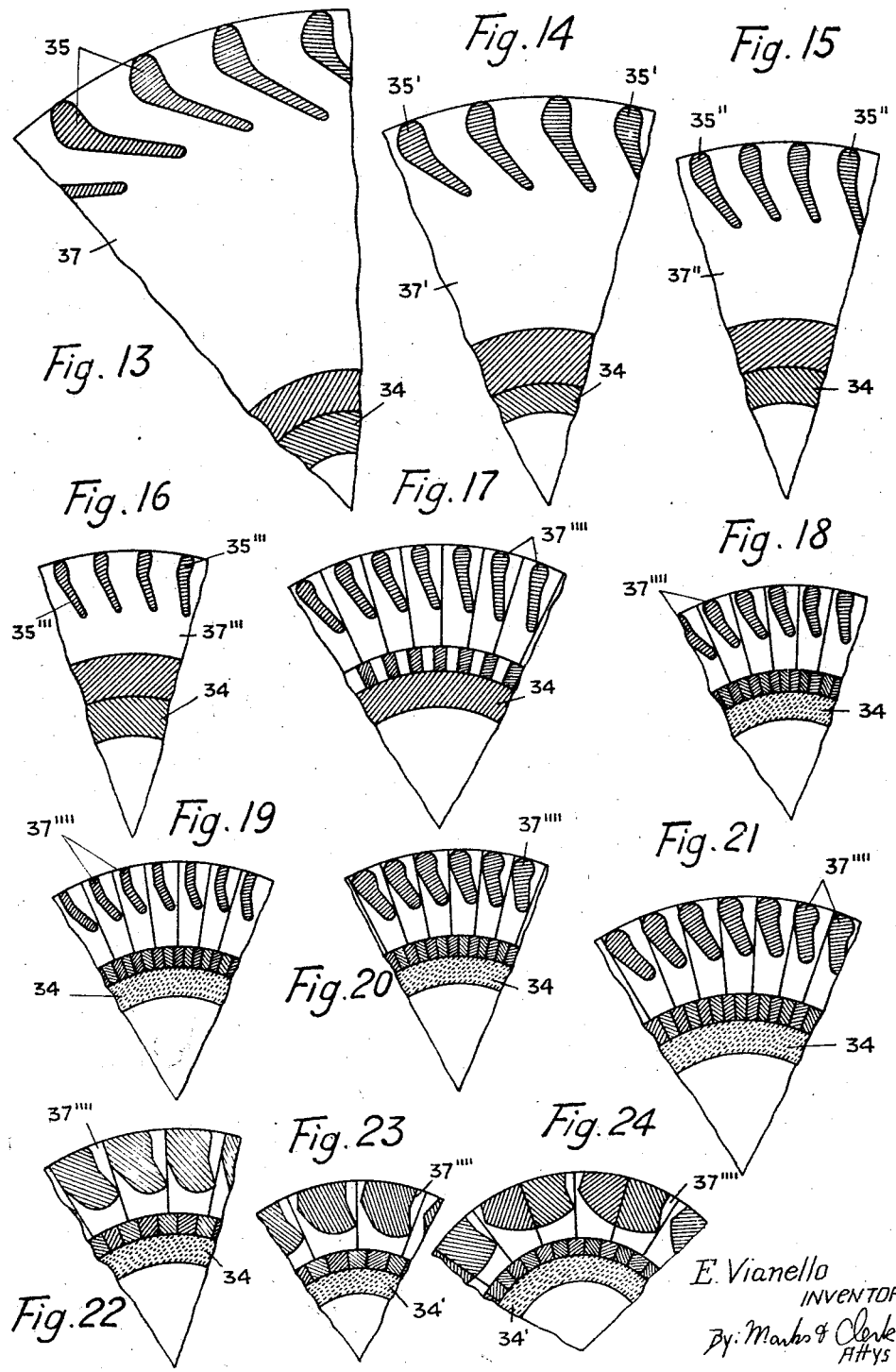

Sept. 28, 1926. 1,601,384
E. VIANELLO
STEAM REGENERATING SYSTEM
Filed Dec. 30, 1921 8 Sheets-Sheet 7

E. Vianello
INVENTOR
By: Marks & Clerk
ATTYS

Sept. 28, 1926.

E. VIANELLO 1,601,384

STEAM REGENERATING SYSTEM

Filed Dec. 30, 1921    8 Sheets-Sheet 8

E. Vianello
INVENTOR

By: Marks & Clerk
Attys

Patented Sept. 28, 1926.

1,601,384

UNITED STATES PATENT OFFICE.

EMILIO VIANELLO, OF SANTA MARGHERITA, ITALY.

STEAM-REGENERATING SYSTEM.

Application filed December 30, 1921, Serial No. 526,061, and in Italy February 25, 1921.

The invention relates to steam regenerating systems for use with steam engines or turbines. Its object is to insure economical operation of condensing steam engines or turbines by making these engines work according to the cycle of maximum efficiency (Carnot's cycle).

Apparatus for economically operating condensing steam engines or the like by a regenerating process has already been proposed. In said process the exhaust steam of the engine is compressed in the same cylinder in which it performs its work, so that this steam is forced to return to the boiler (see British patent to Basevi, 15,158, Sept. 26, 1889).

In another case, the exhaust steam is taken from the exhaust pipe of the engine, conveyed by a special pipe, compressed by a turbo-compressor and forced to return to the boiler (see British patent to Ruble, 5,476, March 19, 1892).

In another case, the steam destined to do work in the engine (see Clark U. S. Patent 736,579 of 1903), is not supplied directly to the engine, but is sent to an injector called in the specification and claims "suction and compression device", from which it discharges into a reservoir. The injector aspires exhaust steam from the exhaust pipe of the engine (motor) and it is sent also to the reservoir, from which it passes to do its work in the engine. It will be seen that with such a process the range of temperature in the cylinders must be very limited, as the reservoir working pressure is about half the working pressure of the boiler, and further the engine can not use a condenser.

In still another case (Vorhees U. S. Patent, 1,066,348, of 1913), a combination has been proposed in which a steam compressor driven by a steam engine, draws and compresses low pressure steam and forces it into contact with a condensing surface, means being provided to cause a substance of lower boiling point at the same pressure as the steam, to contact with said condensing surface and to be heated thereby, by the condensation of the compressed steam thereon.

None of these systems are suitable for ensuring the maximum efficiency of a steam engine or turbine because generally the heat required for doing the work necessary to drive the compressor is not compensated by the heat regained at higher temperature.

Further in the said apparatus, as combined with steam engines or turbines, no means are provided for discharging to the atmosphere without loss of power, the comparatively large amount of air that the compressor unavoidably draws from the condenser together with the exhaust steam.

The improved steam regenerating apparatus of the present invention comprises a multi-stage turbo-compressor fed with steam direct from the condenser and discharging into a receiver which communicates with the boiler, and means whereby water from the hot well is injected in a finely atomized condition in proximity to the suction end of the compressor. The arrangement is such that the mixture of steam and water in the compressor constitutes the whole of the fluid performing the working cycle of the steam engine or turbine, and said mixture is adiabatically compressed from the pressure in the condenser to substantially the boiler pressure, while the said turbo-compressor is also adapted to exhaust the air from the condenser. Means are also provided to discharge the air from the receiver.

The system is illustrated in the accompanying drawings in which:

Fig. 2 is an enlarged vertical sectional view of the turbo-compressor unit.

Fig. 3 is an enlarged transverse vertical sectional view of the main part taken along the line 3—3 of Fig. 1.

Fig. 4 is a similar view taken on line 4—4 of Fig. 1.

Fig. 5 is an axial sectional view of a portion of the apparatus shown in Fig. 4 and taken along line 5—5 of Fig. 4.

Fig. 6 is a partial side view and a partial longitudinal vertical sectional view of the auxiliary turbine and condenser.

Fig. 7 is an axial vertical sectional view of a ball bearing forming part of the apparatus.

Fig. 7ª is an end view of said ball bearing.

Fig. 8 is a top plan view of a portion of the valve manifold employed in atomizing water from the hot well of the main condenser into the turbo-compressor.

Fig. 9 is a vertical sectional view of said manifold.

Fig. 10 is an end view of the same.

Fig. 11 is an enlarged longitudinal vertical sectional view of the receiver which gathers the water steam and air leaving the turbo-compressor.

Fig. 12 is a transverse vertical sectional view of a portion of the same taken on line 12—12 in Fig. 11 and a sectional view of one of the check-valves used in passing air and steam from the receiver to the auxiliary turbine.

Figs. 13, 14, 15, 16, 17, 18, 19, 20, 21, 22, 23 and 24 are transverse vertical sectional views respectively of portions of the first to twelfth inclusive wheels of the turbo-compressor.

Figure 25:
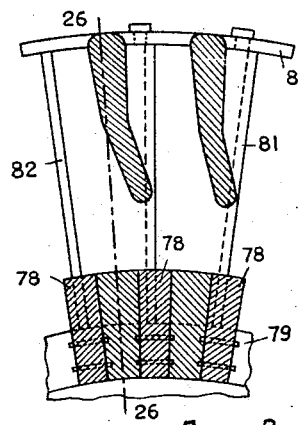

Fig. 25 is a similar view of either one of the fifth to twelfth inclusive wheels and illustrating the manner of connecting the blade segments together and to the shaft. Fig. 25 is taken along the line 25—25 of Fig. 26.

Figure 26:
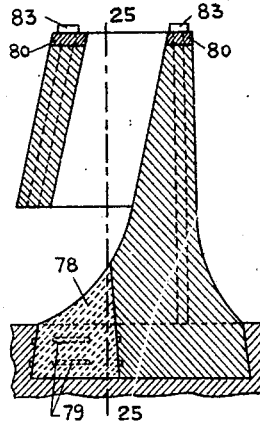

Fig. 26 is a longitudinal vertical sectional view taken on line 26—26 of Fig. 25.

Figure 28:
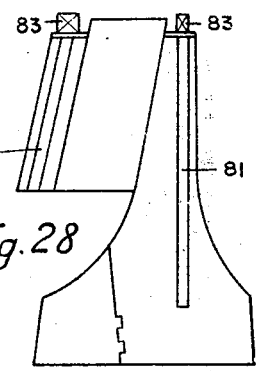
Figure 27:
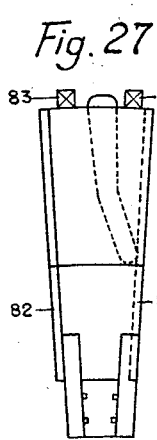
Figure 29:
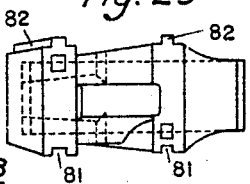

Figs. 27, 28 and 29 are front, side and top plan views respectively of one segment of either of the fifth to twelfth inclusive wheels of the turbo-compressor.

Figure 30:
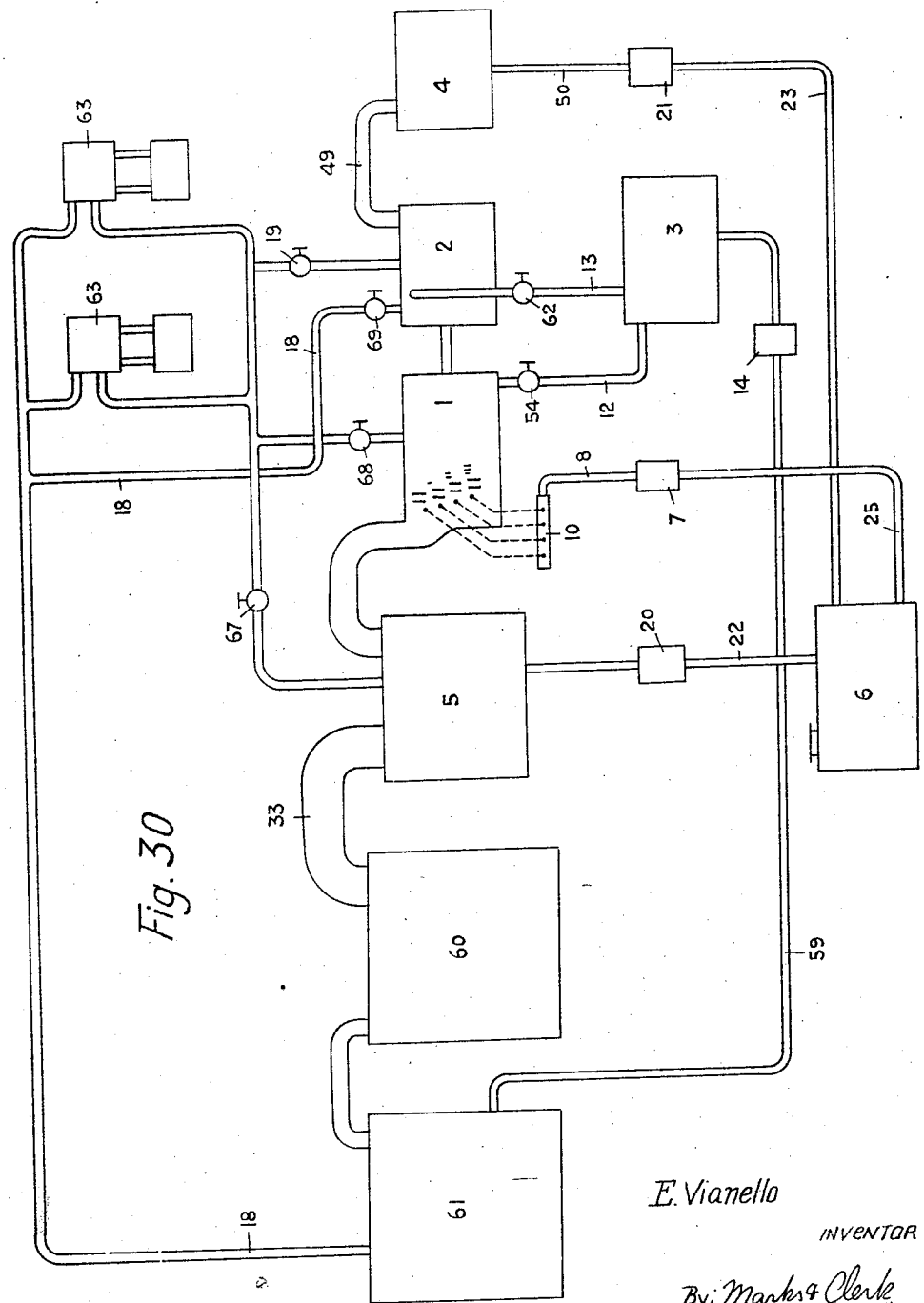

Fig. 30 is a diagrammatic view of the entire apparatus.

Figs. 31 to 35 inclusive are diagrams illustrating the operation of the apparatus.

It is well known that adiabatic compression of a mixture of steam and water will produce a condensation of the steam contained in it, if the weight of water in the mixture is about sixty percent or more, and will produce a vaporization of the water contained in the mixture, if the weight of water contained in it is less than about sixty percent.

The type of adiabatic compression used in the present invention is that represented by the line DA of the cycle ABCDA (Fig. 31), the well known ideal cycle of maximum efficiency relating to a steam engine (the Carnot's cycle).

Such type of adiabatic compression has not until now been practically realized. The main object of the invention is substantially the practical realization of such adiabtic compression so as to provide a stem engine or turbine having maximum efficiency.

In the Carnot's cycle ABCDA, the line AB represents the isothermal expansion; BC the adiabatic expansion; CD the isothermal compression and DA the said adiabatic compression. Suppose that the cycle refers to each kilogram of steam taken from the boiler and that the temperature of the isothermal expansion AB be 195 centigrades (the boiler working temperature) and that the temperature of the isothermal compression CD be 30 centigrades (the condenser temperature) and that in the point B (end of the isothermal expansion) the steam be in dry-saturated condition:

Let $x_1$ $x_2$ $x_3$ $x_4$ represent the fraction of steam weight in the mixture when conditions are those represented by points B, C, D, A respectively. Then:

$$x_1=1$$
$$x_2=0.755$$
$$x_3=0.2273$$
$$x_4=0$$

In my improved steam regenerating system for effecting the adiabatic compression DA, the turbo-compressor draws from the condenser a volume ED of dry-saturated exhaust steam for every kilogram of steam direct from the boilers, to supply the main and auxiliary engines and compresses it, together with all the water which collects in the hot well, that is water in such a quantity as to form in proximity to the suction end of the compressor, a mixture of steam and water containing for every kilogram of the mixture 0.2273 kilogram of steam and 0.7727 kilogram of water. This water being introduced in finely atomized conditions and its weight in the mixture being about 77 per cent, the condensation of the exhaust steam will take place gradually during the whole adiabatic compression while the temperature of the mixture is gradually increasing, so that the compressor will discharge into the receiver, water at the temperature of the boilers.

By comparing the adiabatic compression DA with an adiabatic compression of other type, it will be found that, by using the compression DA, the latent heat of the low pressure steam drawn from the condenser is regained with a minimum mechanical work of the motor which drives the turbo-compressor and a minimum number of rotating wheels.

If for instance, the adiabatic compression were of the type CB, effected by injecting in proximity to the suction end of the turbo-compressor, only as much water as to form a mixture containing 24.5 per cent by weight of water, the latent heat regained and transferred to the feed water does not compensate for the expenditure in heat necessary for the working of the thermic motor which drives the turbo-compressor. Moreover, the number of rotating wheels necessary for increasing the pressure and temperature of the fluid from the condenser pressure to the boiler pressure must be comparatively large. And worse results are obtained by compressing dry-saturated steam or superheated steam.

Figure 31:
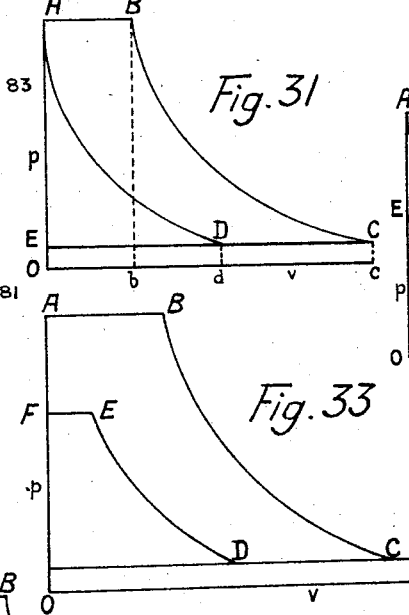

To compare the cycle of working of a steam turbine provided with my steam regenerating apparatus and the cycle of working of an ordinary steam turbine we may again refer to the diagram of Fig. 31. In this diagram the figure ABCEA is assumed to represent the theoretical cycle of working of an ordinary steam turbine. AB is the isothermal expansion; BC the adiabatic expansion; CE the isothermal compression, that is the exhausting stage, and EA represents the change of conditions relating to the feeding stage. In case the working of the turbo-compressor is combined with that of the steam turbine, the working of the turbo-compressor may be assumed to be represented by the lines ED and DA. In this case the part ED of the ordinary isothermal compression CE, does not take place owing to the simultaneous isothermal expansion ED, produced by the turbo-compressor while it draws from the condenser; and further the change of conditions represented by the line EA (feeding stage) is substituted by the line DA, because in the case considered the feed water is conducted to the boiler through the atomizers, the turbo-compressor and the receiver. So that the resulting cycle of working is the cycle of maximum efficiency ABCDA.

Fig. 30 is a general diagram of the complete apparatus. It comprises essentially the turbo-compressor 1, the steam turbine 2 which drives the turbo-compressor 1; the steam receiver 3 and the auxiliary condenser 4. By referring to Figs. 30 and 31 the general working of the apparatus will now be explained. The line AB in diagram Figure 31 denotes the isothermal change of conditions of every kilogram of live steam taken from the boilers 61 for the normal working of the main engine or turbine 60, the auxiliary steam turbine 2 and the auxiliary steam machinery 63. The volume of this kilogram of steam, when OA is considered the working pressure of the boilers, is represented by Ob (Fig. 31). The conditions of the kilogram of steam are then adiabatically changed in the main engine, the auxiliary steam turbine 2 and the auxiliary machinery 63 until its pressure will reduce to that of the main and auxiliary condensers. This change of conditions is represented by the curve BC. Then the steam discharges into the said condensers where it is thoroughly converted into liquid condition. The latter change of conditions is represented by the straight line CE. At the same time the turbo-compressor abstracts from the main condenser 5, by means of the pipe 33, the volume ED of dry-saturated steam and compresses it adiabatically with all the water which collects in the hot well 6 of the steam engine. This water is introduced into the casing of the turbo-compressor in a finely atomized condition through a series of mechanical atomizers 11, 11', 11'', 11''' in which the water is impelled by means of the pump 7, the pipe 8, and the valve manifolds 10. The atomized water is intimately mixed with the steam owing to the whirling effect exerted on the fluids by the rotating wheels of the compressor 1, the angular speed, of which is very high. Owing to the very small volume of the atomized water injected with respect to the volume ED of dry saturated steam, the same ED may be taken as representing the volume of the kilogram of mixture during the suction stage of the turbo-compressor; and the line DA represents the change of conditions during the adiabatic compression caused by the same turbo-compressor.

The size and number of passages through each rotating wheel are calculated in such a way as to ensure that the specific volume of the mixture of steam and water be gradually reduced while its temperature and pressure are increased, so that owing to the required high percentage by weight of water contained in the mixture, the proceeding in the turbo-compressor takes place as in a closed cylinder of an ideal Carnot's engine, in which the steam still existing in the cylinder at the beginning of the adiabatic compression (point D of the diagram) is supposed to be condensed in its totality during the adiabatic compression and at the same time its temperature and pressure increased as before explained.

From the turbo-compressor the hot water at the temperature of the boiler is conducted to the receiver 3 through the pipe 12.

From the receiver 3 the hot water is drawn by the feed pump 14 and fed through the pipe 59 to the boiler 61. The receiver 3 is kept about half filled with water. Its main function is to separate the air from the water. The steam and air coming from the turbo-compressor together with the hot water, is stored above the water level and pass through pipe 13 into the casing of the auxiliary steam turbine 2, before the first or the second revolving wheel of the auxiliary turbine 2. Then they pass throughout the whole blading of this turbine producing useful work in it together with the live steam which comes directly from the boiler 61, through the pipe 18. The steam and air then discharge into the auxiliary condenser, this condenser being used principally for eliminating the air taken from the main condenser 5 by the turbo-compressor.

The pipe 13 is fitted with an ordinary type of self-acting check valve 62 suitable for the working pressure of the stage in the auxiliary turbine, into which this pipe admits the steam.

The auxiliary steam turbine 2 may also be supplied with exhaust steam from the auxiliary steam machinery 63 by means of the pipe 19.

The condensed water taken from the main and auxiliary condensers by means of the pump 20 and air pump 21 is delivered through the pipes 22, 23 into the hot well 6, from which the water is conducted, by means of the pipe 25 and pump 7 to the atomizers 11, 11', 11'', 11'''. If the pressure reached in the separating receiver 3 is a little higher than that of the boiler working pressure, the pump 14 may be eliminated, the hot water being in this case forced into the boiler 61 by the difference of the existing pressure in the receiver and in the boiler.

Referring now to the specific details of the apparatus, attention is now directed particularly to Figs. 1 to 29 inclusive. As before stated the multi-stage turbo-compressor 1 is driven by the auxiliary steam turbine 2 and draws from the main condenser 5 to which the apparatus is connected. The feed water is taken from the hot well 6 of the main engine and auxiliary steam machinery by means of the pump 7 and delivered into the casing of the turbo-compressor 2 through the pipe 8, the series of valves 9, 9', 9'', the valve manifolds 10, 10', 10'' and the series of mechanical atomizers 11, 11', 11''. From the turbo-compressor the hot water together with air is conducted to the receiver 3 through the pipe 12. From the receiver 3 the hot water is drawn by the feed pump 14 and fed through the pipe 59 to the boiler. If the receiver pressure can be kept a little higher than the boiler pressure this fluid can be conducted directly to the boiler through the pipe 15. From the receiver 3 the air and steam will pass through the pipe 13 into the first stage of the auxiliary steam turbine 2, in which they exert force throughout the whole blading together with the live steam which comes directly from the boilers through the pipe 18 and then discharge in the auxiliary condenser 4.

If the boiler pressure is not reached in the receiver 3, the air and steam of the receiver 3 will be discharged by means of the pipes 16 and 17 into a stage of the auxiliary steam turbine in which the existing pressure in normal work is low enough to admit the fluid to flow into it. The pipes 13, 16, 17 are provided with self acting check valves 13', 16', 17' of the ordinary type. The auxiliary turbine 2 may also be supplied with exhaust steam from the auxiliary machinery, by means of the pipe 19.

The water pump 20 is located about a meter or more below the bottom of the main condenser in order to aid this pump to exhaust the water from the said condenser The condensed water taken from the main and auxiliary condenser by means of the pump 20 and air pump 21 is delivered through the pipes 22, 23 into the hot well 6. Then the water passes into the feed filter 24 from which it is drawn and forced by the pump 7 to the atomizers 11, 11', 11'' through the pipe 25.

29 is a thrust ball bearing, the shaft of which is adapted to support the differential thrust due to the opposite action of both the turbo-compressor and the auxiliary steam turbine.

30, 30 are the base plates.

The circulating water enters the condenser 5 through pipe 31 and discharges through pipe 32.

As best shown in Fig 2 the shaft of the turbo-compressor is hollow and has such a size as to withstand with safety, the exceptional stresses to which it is subjected owing to the high speed of the same. It is preferably made of three sections, 34, 34', 34''. The rotating wheels 37, 37', 37'', and 37''' are keyed on the shaft alternately with the intermediate pieces or rings 36, 36' and 36''. The blades 35, 35', 35'' and 35''' of the wheels are integral with said wheels while the blades of the subsequent eight wheels 37'''' are made in sections fixed on the shaft sections 34 and 34'.

All the impellers or wheels are limited at the low pressure side by rings 41, 41', 41'' arranged in such manner as to closely approach the stationary diaphragms 40, 40', 40'' which limit the several stages into which the turbo-compressor is divided. 38 and 39 designate packing glands arranged at the ends of the compressor shaft.

Attention is directed to Fig. 3 at this point, to illustrate the connection between the suction end of the turbo-compressor 1 and the main condenser 5. This view clearly shows the manner in which the pipe 33 is connected to the condenser and compressor.

Fig. 4 illustrates clearly the manner in which the atomizers 11, 11' and 11'' are arranged on the casing of the turbo-compressor 1. This view also illustrates the manner in which the pipe 12 (leading from the compressor 1 to the receiver 3) is constructed. It will be noted from this figure taken in connection with Figure 5, that a self-acting check-valve 54 provided with a spring is arranged in the pipe 12. This valve functions to check any return motion of the fluid from the receiver 3 to the turbo-compressor.

Referring now to Fig. 6, the details of the auxiliary steam turbine 2 that drives the turbo-compressor 1 will be described. This turbine is of the ordinary type and has no peculiarity of any importance. It must only be adapted to rotate the turbo-compressor at 4,500 or more revolutions per minute.

The section of the tube 18, that supplies the steam directly to the turbine 2 from the boiler 61 is calculated on the basis of the steam work necessary for the desired compression. The auxiliary steam turbine includes the impulse wheel 44 and four sets of reaction wheels 44', 44'', 44''' and 44''''. The wheel 44 has three rows of blades and two rows of deflectors. The nozzles 43, one of which is shown in this figure, are placed as usual in the ordinary steam turbine on the upper part of the half casing 45. Each nozzle is provided with means (not shown) which permits the closing of the steam passageway when desired.

The blades of the reaction wheels 44', 44" etc. are fastened on the shaft 46 and the stationary blades are secured to the casing. Each of these reaction wheels with the exception of the wheel 44''''' has three rows of blades and the wheel 44''''' has only two.

It will be understood that when steam is supplied through the pipes 16, 17 and 19, the admission of the direct steam supplied from the boiler 61 through the pipe 18 will be reduced.

47 and 48 designate packing glands which are of the usual type arranged upon the admission and exhaust chambers. 49 is the exhaust steam pipe, 50 the suction pipe of the air pump 21; 51 and 52 are the inlet and exhaust pipes for the cooling water of the auxiliary condenser. The shaft is made in two sections 46 and 46', and 28 designates a coupling securing shafts 34" and 46 together.

The details of the thrust bearing 29 are illustrated in Figs. 7 and 7ª, and it may be seen from these figures that the inner and outer rings 73 and 74 of the ball cage are made in sections to facilitate assemblage and dismantling.

Figs. 8, 9 and 10 show the details of the manifold 10 for controlling the water issuing through the atomizers 11, 11' etc. This manifold has a longitudinally extending passageway 10ª which supplies the water to the chambers 10ᵇ. The passage of water to these chambers is controlled by valves 10ᶜ, and from the chambers the water is conveyed by pipes 10ᵈ to the atomizers.

Figure 1:
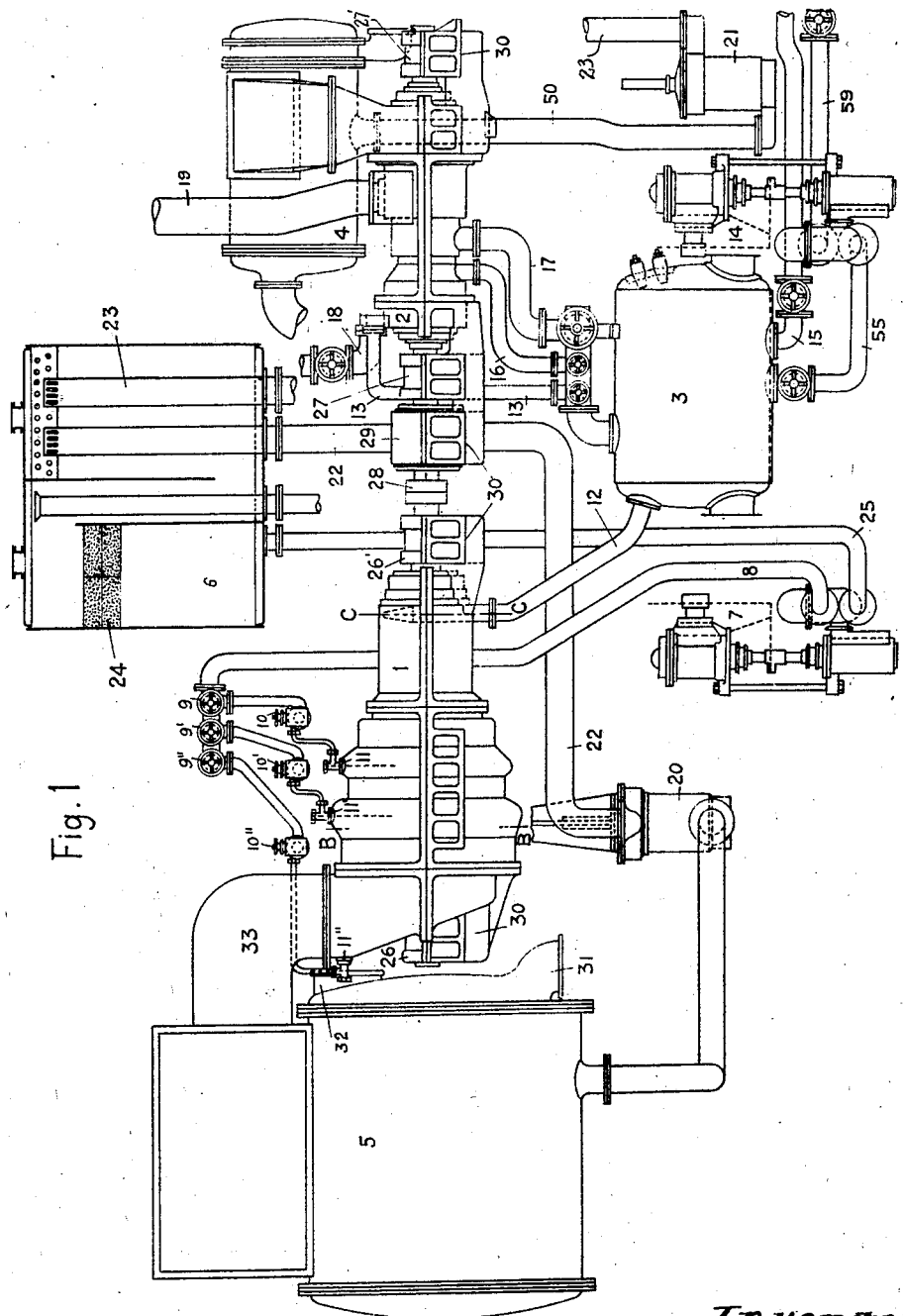
Figure 1 is a side view partly in section of the main portion of the apparatus.

The receiver 3 is shown in detail in Figs. 11 and 12 and it may be stated that this receiver is preferably formed of steel plates and is provided with a man-hole 58. The internal tubular extension 53 to which the fluid conveyed by the pipe 12 (Fig. 1), directs the fluid towards the bottom of the receiver, and a battery of small tubes is provided in the lower part of the receiver. These tubes function to circulate hot gases or steam, which enter through the conduit 56 and exit through the conduit 57, in order to heat the water at the beginning of the working. In said figures self-acting check valve casings 70, 71 and 72 are shown, leading to the casing of the auxiliary steam turbine 2 through the pipes 13, 16 and 17 (Fig. 1). One of these valves is shown in section in Fig. 12 and is designated 72ª. The pump 14 shown in Figure 11 functions to draw water through the pipe 55 and past the valve 75 and to force this hot water to the boiler 61 through the pipe 59 having the valve 77. The pipe 15 having the valve 76 may be used to convey the hot water directly to the boiler 61 without the use of a pump in case the pressure in the receiver 3 is higher than the boiler pressure.

Referring now to Figs. 13, 14, 15 and 16, it may be seen that the blades of the wheels 37, 37', 37", 37''' are integral with the wheels, while Figs. 17 to 24 inclusive illustrate that the wheels 37''''' are made in sections. From Figs. 13 to 24 inclusive it may also be seen that the total passageway across the rims of the rotating wheels is gradually diminished from the first to the last wheel. A gradual diminution of this passageway is necessary for producing the compression and contemporaneous condensation of the steam in the turbo-compressor. In the present apparatus this diminution is effected without reducing the peripheral speeds too greatly and so as to always maintain high centrifugal force, and permit the compressor to produce great final pressure with a few impeller wheels.

Figs. 25 to 29 inclusive illustrate the contruction of the wheel segments and the manner in which said segments are secured together and fastened to the shaft. It may be seen that said segments are fastened together and to the rotor by wedge pieces 78 of special bronze such as is used for the construction of ordinary reaction steam turbines. These wedges are forced between adjacent segments in such manner as to compel the metal to expand into the grooves 79 which are provided in the bases of the segments and in the body of the rotor. At the periphery, the elements are secured together by rings 80 which are fixed by rivets 83. Each segment is provided with projecting ribs 82 at one edge and grooves 81 at the opposite edge and from Fig. 25 it may be seen that the ribs of each segment extend into the grooves of an adjacent segment.

Figure 32:
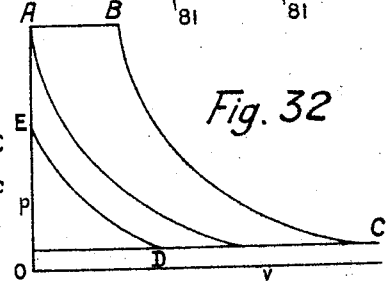

When the turbo-compressor of the apparatus runs at a reduced speed the working according to the Carnot's cycle is not realized but some considerable advantages will still be obtained as the result of the cycle ABCDEA of the diagram in Fig. 32.

Figure 33:
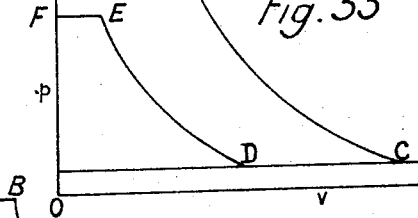

If the angular speed of the turbo-compressor is maintained at the normal value as calculated, but some rotating wheels are suppressed, the volume of the steam taken out from the main condenser may still be the same, but the working pressure of the boilers could not be reached in the receiver 3. The cycle of this working is illustrated by the diagram of Fig. 33. The efficiency will be smaller than that of the Carnot's cycle but also advantageous if compared to that of an ordinary engine. The volume EF of steam will be discharged in a stage of the steam turbine 2 in which the pressure is lower than that represented by the ordinate OF.

Figure 34:
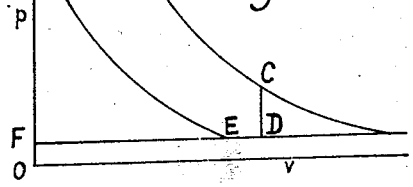

If the steam regenerating apparatus is applied to a reciprocating steam engine, the general cycle of working is represented by ABCDEA in the diagram of Fig. 34. Even in this case the advantage in fuel economy will be remarkable, as may be easily seen by comparing the amount of heat converted in work for every kilogram of steam subjected to the cycle and the heat taken from the boilers by this kilogram of steam.

Moreover, it may be established that a reciprocating steam engine fitted with the steam regenerating system (Fig. 1) constitutes a "mixed engine" in which a fraction of the steam working in it undergoes a complete expansion from the pressure of the boilers to that of the condenser.

The actual effect that the turbo-compressor in combination with a steam engine or turbine is able to produce, may only be determined by experiments, but it certainly is not erroneous to state that a lowering of 15° or 20° Centigrade of the inner temperature of the main condenser can be obtained.

In order to compare the efficiency of the cycle ABCEA (Rankine's cycle) with the efficiency of the cycle ABCDA (Carnot's cycle) Fig. 31 let $t_1$ $q_1$ $r_1$ $x_1$ indicate the temperature, the heat of liquid, the latent heat of evaporation and the fraction of steam weight in the mixture (quality of steam); all these quantities referring to the initial conditions of the steam, and let $t_2$ $q_2$ $r_2$ $x_2$ indicate the elements stated but referring to the final condition of the steam.

Then the efficiency of a common steam engine is given by the formula:

$$R = \frac{q_1 - q_2 + x_1 r_1 - x_2 r_2}{q_1 - q_2 + x_1 r_1}$$

Assuming for $x_1$ $t_1$ $t_2$ the following values:

$x_1 = 1$  $t_1 = 195°$  $t_2 = 45°$ Centigrade the efficiency results:

$R = 0.291$

If the engine is provided with any steam regenerating apparatus the efficiency will be the maximum as given by the well known formula $$R = \frac{T_1 - T_2}{T_1}$$

in which $T_1$ and $T_2$ are the absolute temperatures in correspondence with $t_1$ and $t_2$.

Taking $T_1 = 468°$ and $T_2 = 303°$ the efficiency will be $$\frac{468 - 303}{468} = 0.352$$

The advantage obtained by the present steam regenerating system is therefore about 21 percent.

Figure 35:
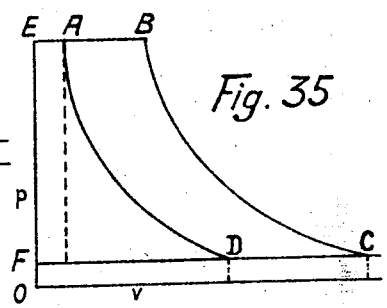

The diagram in Fig. 35 represents the working of an ordinary steam turbine fitted with the present steam regenerating system in which the steam at the end of the adiabatic compression (point A) is not completely converted into water. In this case EB represents the isothermal expansion, BC the adiabatic expansion, CD the isothermal and DA the adiabatic compression, the latter being accomplished by means of the steam regenerating system. FD is the volume of steam drawn from the condenser by the turbo-compressor and AE the volume of steam contained in the fluid whilst it enters in the receiver 3. This volume of steam passes into the auxiliary steam turbine 2 in which it performs useful work effecting a complete expansion. Therefore, the boilers must supply in this case only a volume AB of steam direct to the apparatus.

Let $x_1$ $x_2$ $x_3$ $x_4$ be the qualities of steam indicating the points B C D A respectively and suppose to be $x^1 = 1$. Then the efficiency in this case is given by the formula:

$$R = \frac{r_1 - x_4 r_1 - (x_2 - x_3) r_2}{r_1 - x_4 r_1}$$

As formerly stated the aparatus may allow the working of an engine according to a Carnot's cycle or according to a cycle which comprises an adiabatic compression more or less extended implying a gradual condensation of the steam for the purpose of obtaining the maximum efficiency or nearly this maximum.

The maximum efficiency is realized when the compression effected by the turbo-compressor is extended from $t_2$ to $t_1$ and the engine with which the steam regenerating apparatus is combined, is a steam turbine. In fact the theorectical working of an ordinary steam turbine involves a complete expansion of the steam as represented by curve BC (diagram in Fig. 31). On the other hand by the simultaneous working of the turbo-compressor the change of condition represented by the curve DA is also realized.

What I claim and desire to secure by Letters-Patent is:

1. An improved steam regenerating system including a main steam engine, a boiler for supplying steam to said engine, a main condenser receiving steam from said engine, a turbo-compressor, means for conveying steam from the condenser to the inlet end of the compressor, a hot well receiving water from said condenser, means for conveying water from the hot well and injecting the same in a finely atomized condition into the suction end of the compressor in order to form at this end a mixture of steam from the condenser and water from the hot well, which constitutes all of the fluid performing the working cycle, said compressor being adapted to adiabatically compress said mixture from the pressure in the condenser to substantially the pressure in the boiler, the proportion of steam and water at the said inlet end of the compressor being such as to obtain by the adiabatic compressure a gradual and substantially complete condensation of the steam contained in the mixture, said compressor being also arranged to exhaust the air from said condenser, a receiver connected to the exhaust end of the compressor and adapted to receive air and steam from said compressor, means for discharging air from the receiver, and means for conveying fluid from the receiver to said boiler.

2. A system as claimed in claim 1 in which the compressor is of the multi-stage type.

3. A system as claimed in claim 1 including an auxiliary steam engine for driving said compressor, means for conveying steam from the boiler to said auxiliary engine, means for conveying air and steam from the receiver to the auxiliary steam engine to permit the last mentioned steam and air to assist in driving the auxiliary engine and to eliminate the air from the receiver, an auxiliary condenser receiving fluid from said auxiliary engine, and means for conveying fluid from the auxiliary condenser to the hot well.

In testimony whereof I have signed my name to this specification.

EMILIO VIANELLO.